(12) United States Patent
Kim (10) Patent No.: US 9,454,275 B2
(45) Date of Patent: Sep. 27, 2016

(54) TOUCH PANEL

(71) Applicant: LG INNOTEK CO., LTD., Seoul (KR)

(72) Inventor: Jong Il Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 39 days.

(21) Appl. No.: 14/469,239

(22) Filed: Aug. 26, 2014

(65) Prior Publication Data

US 2015/0084917 A1    Mar. 26, 2015

(30) Foreign Application Priority Data

Sep. 24, 2013  (KR) .................. 10-2013-0113525

(51) Int. Cl.
*G06F 3/044* (2006.01)

(52) U.S. Cl.
CPC ..... *G06F 3/044* (2013.01); *G06F 2203/04103* (2013.01)

(58) Field of Classification Search
CPC .............. G06F 3/044; G06F 2203/04103; G06F 2203/04111; G06F 2203/04112
USPC ......................................... 345/174
See application file for complete search history.

(56) References Cited

U.S. PATENT DOCUMENTS

| | | | | |
|---|---|---|---|---|
| 8,952,911 B2* | 2/2015 | van Lieshout | ........ | G06F 1/1643 345/173 |
| 9,195,277 B2* | 11/2015 | Park | ........ | G06F 1/1692 |
| 2007/0159570 A1* | 7/2007 | Nagasawa | ........ | G02F 1/136213 349/54 |
| 2010/0171718 A1* | 7/2010 | Denda | ........ | G06F 3/044 345/173 |
| 2011/0227847 A1* | 9/2011 | Yoshiyama | ........ | G06F 3/041 345/173 |
| 2012/0073866 A1* | 3/2012 | Hirai | ........ | G06F 3/044 174/257 |
| 2012/0235927 A1* | 9/2012 | Ho | ........ | G06F 3/044 345/173 |
| 2013/0076667 A1* | 3/2013 | Jiang | ........ | G06F 3/041 345/173 |
| 2013/0168220 A1* | 7/2013 | Ho | ........ | G06F 3/044 200/600 |
| 2013/0256008 A1* | 10/2013 | Zeng | ........ | H01H 11/00 174/257 |
| 2013/0271408 A1* | 10/2013 | Xie | ........ | G06F 3/044 345/173 |
| 2014/0152915 A1* | 6/2014 | Lu | ........ | G06F 1/1643 349/12 |
| 2014/0176492 A1* | 6/2014 | An | ........ | G06F 3/044 345/174 |
| 2014/0176823 A1* | 6/2014 | Jeon | ........ | G06F 3/041 349/12 |
| 2014/0176829 A1* | 6/2014 | Choe | ........ | G02F 1/13338 349/12 |
| 2014/0210749 A1* | 7/2014 | Park | ........ | G06F 3/044 345/173 |
| 2014/0340597 A1* | 11/2014 | Sato | ........ | G02F 1/13338 349/12 |
| 2015/0169109 A1* | 6/2015 | Park | ........ | G06F 3/044 345/174 |

* cited by examiner

*Primary Examiner* — Tom Sheng
(74) *Attorney, Agent, or Firm* — Saliwanchik, Lloyd & Eisenschenk

(57) ABSTRACT

Disclosed is a touch panel. The touch panel includes a cover substrate comprising an active area and an inactive area, a sensing electrode on the active area, and a wire electrode on the inactive area. The wire electrode includes a material the same as a material constituting the sensing electrode.

14 Claims, 9 Drawing Sheets

TOUCH PANEL

CROSS-REFERENCES TO RELATED APPLICATION

This application claims the benefit under 35 U.S.C. §119 of Korean Patent Application No. 10-2013-0113525, filed Sep. 24, 2013, which is hereby incorporated by reference in its entirety.

BACKGROUND

Technical Field

The embodiment relates to a touch panel.

Recently, a touch panel, which performs an input function through the touch of an image displayed on a display by an input device such as a stylus pen or a hand, has been applied to various electronic appliances.

The touch panel may be mainly classified into a resistive touch panel and a capacitive touch panel. In the resistive touch panel, glass is shorted with an electrode due to the pressure of the input device so that a touch point is detected. In the capacitive touch panel, the variation in capacitance between electrodes is detected when a finger of the user is touched on the capacitive touch panel, so that the touch point is detected.

In the resistive type touch panel, the repeated use thereof may degrade the performance thereof, and cause scratches. Accordingly, the interest in the capacitive type touch panel representing superior endurance and having a long lifespan is increased.

The touch panel may be provided in various types depending on positions where a sensing electrode is formed. For example, the sensing electrode may be formed on a cover substrate.

In this case, a printing layer is formed in a Bezel area where a touch is not sensed, and a wire electrode is formed on the printing layer. The wire electrode may be connected with the sensing electrode. Accordingly, a touch signal generated from the sensing electrode is transmitted to a printed circuit board connected with the wire electrode through the wire electrode. Accordingly, a driving chip mounted on the printed circuit board recognizes the touch signal so that the touch panel can be operated.

In this case, the printing layer is provided with a predetermined step difference. The wire electrode is provided on the printing layer having the step difference. In other words, the wire electrode is provided on the step difference part of the printing layer, so that the wire electrode may be damaged as the wire electrode may be cracked or disconnected in the step difference part.

In addition, as the sensing electrode and the wire electrode are provided through mutually different processes, the process efficiency may be degraded.

Therefore, a touch panel having a novel structure to overcome the above disadvantage is required.

BRIEF SUMMARY

The embodiment provides a touch panel which can be easily provided, and includes a wire electrode having reduced resistance.

According to the embodiment, there is provided a touch panel including a cover substrate including active and inactive areas, a sensing electrode provided on the active area, and a wire electrode provided on the inactive area. The wire electrode includes the same material as that of the sensing electrode.

As described above, the touch panel according to the embodiment includes the first and second wire electrodes provided on the inactive area. In other words, the first and second wire electrodes can be stacked on each other on the inactive area.

In addition, the first and second wire electrodes can include the same material as that constituting the sensing electrode. In other words, the first and second wire electrodes can be simultaneously provided in the process of providing the first sensing electrode or the second sensing electrode.

Therefore, the process of separately forming the wire electrode can be omitted, so that the number of processes can be reduced to improve the process efficiency.

In other words, at least one of the first and second wire electrodes is connected with the sensing electrode. If one of the first and second wire electrodes is cracked so that the cracked wire electrode does not perform a wire function, since the other wire electrode can serve as a wire, the reliability of the touch panel can be improved.

In addition, the first and second wire electrodes are formed in a parallel structure, that is, at a predetermined thickness on the inactive area, so that only resistance approximate to that of a conventional wire electrode including a metallic material is generated even if the wire electrode includes a transparent conductive material such as ITO. Accordingly, the efficiency of the touch panel can be improved.

DETAILED DESCRIPTION

In the following description of the embodiments, it will be understood that, when a layer (or film), an area, a pattern, or a structure is referred to as being "on" or "under" another substrate, another layer (or film), another area, another pad, or another pattern, it can be "directly" or "indirectly" on the other substrate, layer (or film), area, pad, or pattern, or one or more intervening layers may also be present. Such a position of the layer has been described with reference to the drawings.

The thickness and size of each layer (or film), area, pattern or structure shown in the drawings may be exaggerated, omitted or schematically drawn for the purpose of convenience or clarity. In addition, the size of elements does not utterly reflect an actual size.

Hereinafter, the embodiment will be described with reference to accompanying drawings.

Referring to FIGS. 1 to 9, a touch panel according to first and second embodiments includes a cover substrate 100 including an active area and an inactive area, a sensing electrode 200 provided on the active area, and a wire electrode 300 and a printing layer 400 provided on the inactive area.

The cover substrate 100 may include glass or plastic. For example, the cover substrate 100 may include tempered glass, half-tempered glass, sodalime glass, reinforced plastic, or flexible plastic.

The cover substrate 100 may include an active area AA and the inactive area UA. The active area AA refers to an area through which a touch instruction may be input by a user. To the contrary to the active area AA, the inactive area UA refers to an area to which the touch instruction is not input because the inactive area UA is not activated even if the touch of the user is input thereto The sensing electrode 200 may be directly formed on the cover substrate 100. In detail, the sensing electrode 200 may be provided on the active area AA. In this case, the active area AA may include not only one surface or an opposite surface of the cover substrate 100, but also all areas overlapped with the active area of the cover substrate 100 on one surface or an opposite surface of a substrate positioned on the one surface or the opposite surface of the cover substrate 100.

For example, the sensing electrode 200 may be provided on the active area AA of the cover substrate 100. The sensing electrode 200 may include a first sensing pattern arranged in a first direction and a second sensing electrode pattern arranged in a second direction. In this case, the first direction may extend different from the second direction. For example, the first direction may cross the second direction.

Both of the first and second sensing electrode patterns may be directly formed on one surface of the cover substrate 100. As both of the first and second sensing electrode patterns are formed on the one surface of the cover substrate 100, since a process of reversing or cleaning the cover substrate 100 is not required, the process efficiency can be improved.

Referring to FIGS. 2 to 9, a first sensing electrode 210, a second sensing electrode 220, a bridge electrode 230, and a first insulating layer 240 may be provided on the active area AA of the cover substrate 100.

The first sensing electrode 210, the second sensing electrode 220, and the bridge electrode 230 may include a conductive material. In detail, the first sensing electrode 210, the second sensing electrode 220, and the bridge electrode 230 may include a transparent conductive material. For example, the first sensing electrode 210, the second sensing electrode 220, and the bridge electrode 230 may include a transparent conductive material such as indium tin oxide (ITO). However, the embodiment is not limited thereto, and the sensing electrodes and the bridge electrode may naturally include a metallic conductive material such as copper (Cu) and silver (Ag).

Referring to FIGS. 2 to 5, in the touch panel according to the first embodiment, the bridge electrode 230 may be provided on the active area AA of the cover substrate 100, and the first insulating layer 240 may be provided on the bridge electrode 230. In detail, the first insulating layer 240 may partially cover the bridge electrode 230. Accordingly, the bridge electrode 230 may include a close area covered by the first insulating layer 240 and an open area that is not covered by the first insulating layer 240.

The first sensing electrode 210 may make contact with the bridge electrode 230. In other words, the first sensing electrode 210 may make contact with the open area of the bridge electrode 230.

In addition, the second sensing electrode 220 may be provided on the first insulating layer 240. In other words, the second sensing electrode 220 may be provided on the close area of the bridge electrode 230.

Referring to FIGS. 6 to 9, in a touch panel according to the second embodiment, the first and second sensing electrodes 210 and 220 may be provided on the active area AA of the cover substrate 100, and the first insulating layer 240 may be provided to surround the first and second sensing electrodes 210 and 220.

The bridge electrode 230 may be provided on the first insulating layer 240. In addition, the first insulating layer 240 may be provided therein with a through hole. The bridge electrode 230 may be connected with the sensing electrode 220 through the through hole.

In the same manner, a plurality of first sensing electrodes are connected with a plurality of second sensing electrodes on the cover substrate 100. In other words, the first sensing electrodes are not electrically connected with the second sensing electrodes by the insulating layer on the active area of the cover substrate 100.

Although the above description has been made in that the sensing electrode is provided on the cover substrate, the embodiment is not limited thereto, and the sensing electrode may be provided on a substrate on the cover substrate.

Figure 10:
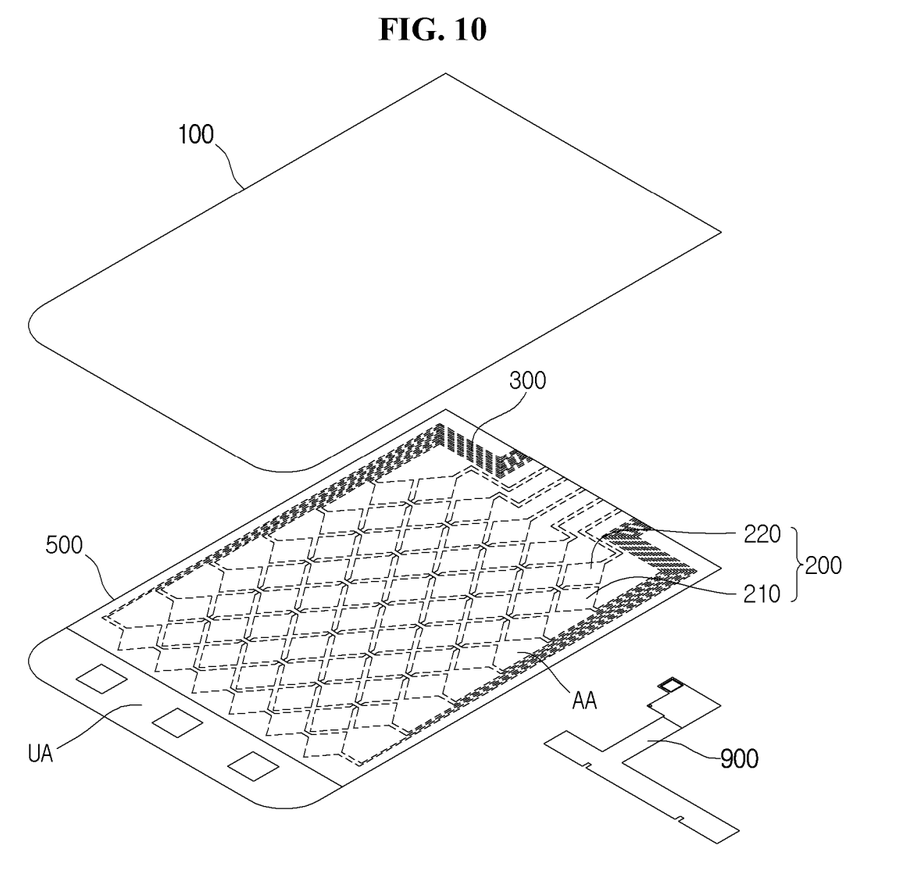
FIG. 10 is a perspective view showing a touch panel according to the third embodiment.

Referring to FIG. 10, a substrate 500 is provided on the cover substrate 100. The first sensing electrode 210, the second sensing electrode 220, the bridge electrode 230, and the first insulating layer 240 may be provided on the substrate 500. The substrate 500 may include plastic such as polyethylene terephthalate (PET).

The first sensing electrode 210, the second sensing electrode 220, the bridge electrode 230, and the first insulating layer 240 have the same connection scheme as those of the first and second embodiments described above, and the details thereof will be omitted.

The printing layer 400 may be provided on the inactive area UA of the cover substrate 100. The printing layer 400 may be formed with a predetermined step difference. The printing layer 400 may be formed in multiple layers. In detail, the printing layer 400 may be formed in the multiple layers by printing black ink or white ink as shown in FIGS. 1 to 4. The printing layer 400 prevents the wire electrode 300 formed on the inactive area UA from being viewed outside.

The wire electrode 300 may be provided on the inactive area UA of the cover substrate 100. In detail, the wire electrode 300 may be provided on the printing layer 400.

The wire electrode 300 may include first and second wire electrodes 310 and 320.

Figure 1:
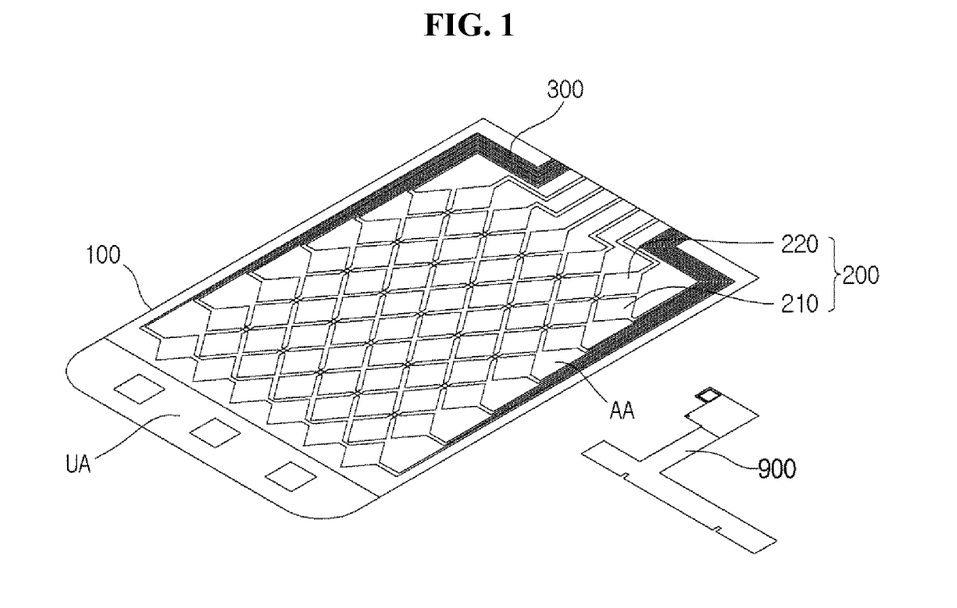
FIG. 1 is a perspective view showing a touch panel according to first and second embodiments.
Figure 2:
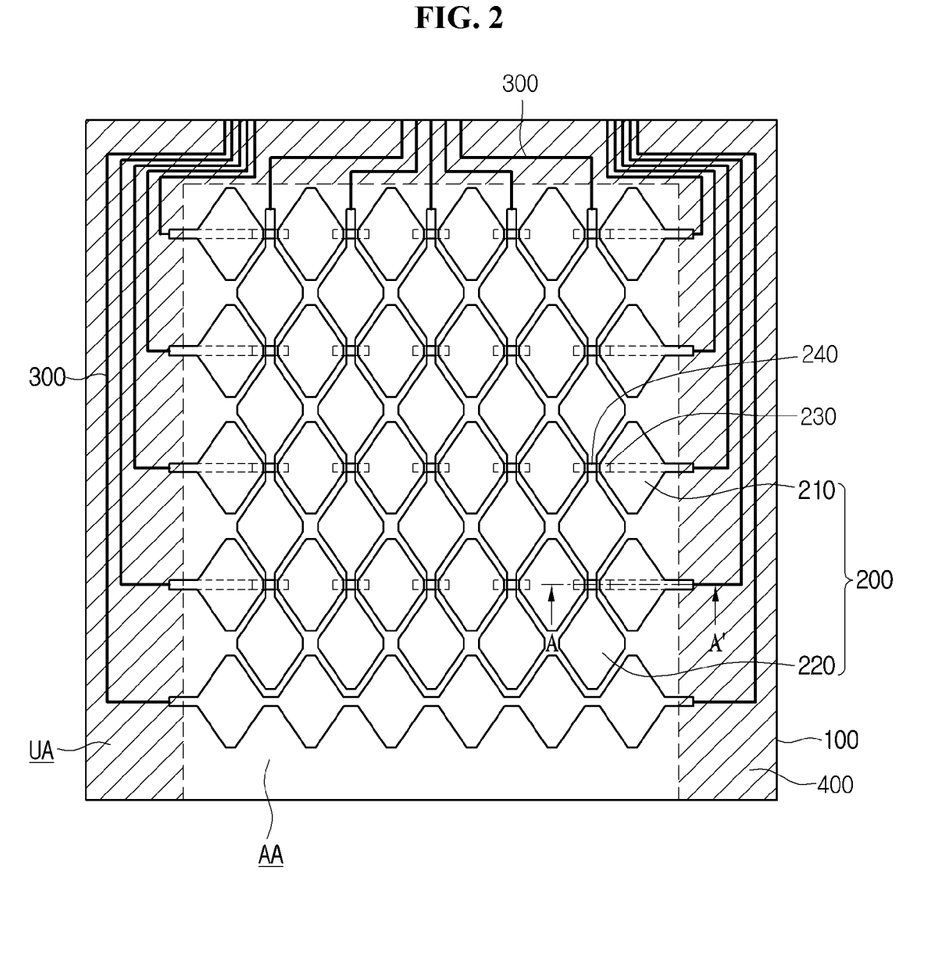
FIG. 2 is a plan view showing a touch panel according to the first embodiment.
Figure 3:
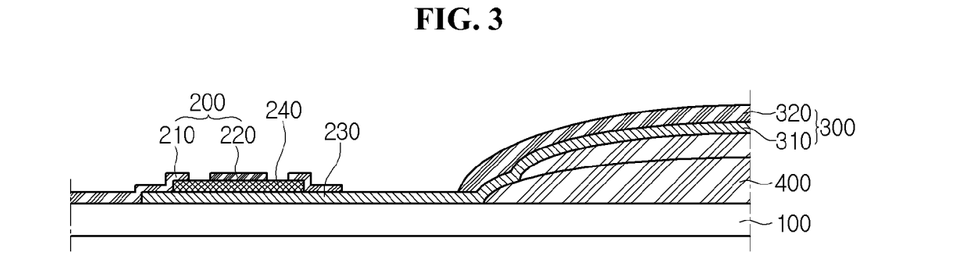
FIGS. 3 to 5 are sectional views taken along a line A-A' of FIG. 1 according to various embodiments.

Referring to FIG. 3, the first wire electrode 310 may be provided on the inactive area UA of the cover substrate 100. In addition, the second wire electrode 320 may be provided on the first wire electrode 310. In other words, the first and second wire electrodes 310 and 320 may be stacked on each other.

The wire electrode 300 may include a conductive material. In detail, the wire electrode 300 may include the same material as that constituting the sensing electrode 200 or the bridge electrode 230. In detail, the first wire electrode 310 may include a material the same that constituting the bridge electrode 230. In addition, the second wire electrode 320 may include a material the same as that constituting the second sensing electrode 220.

In other words, the first wire electrode 310 may be formed together with the bridge electrode 230 through the same process. In addition, the second wire electrode 320 may be formed together with the first sensing electrode 210 or the second sensing electrode 220 through the same process. Accordingly, the first and second wire electrodes 310 and 320 may include a transparent conductive material such as ITO.

Figure 7:
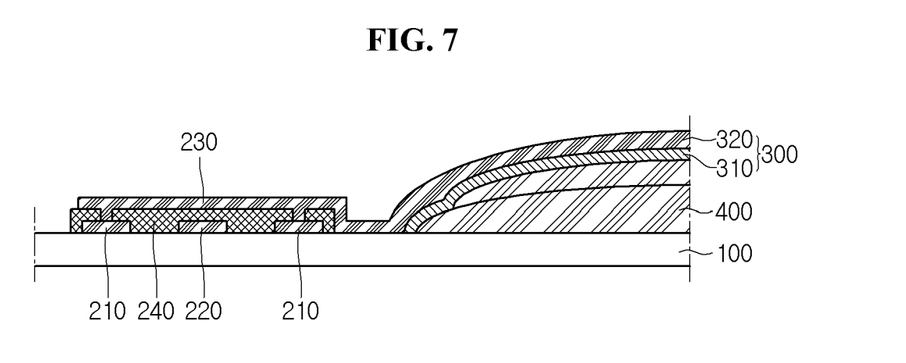
FIGS. 7 to 9 are sectional views taken along line B-B' of FIG. 6 according to various embodiments.

In addition, referring to FIG. 7, the wire electrode 300 may include a conductive material. In detail, the wire electrode 300 may include the same material as that constituting the sensing electrode 200 or the bridge electrode 230. In detail, the first wire electrode 310 may include the same material as those constituting the first and second sensing electrodes 210 and 220. In addition, the second wire electrode 320 may include the same material as that constituting the bridge electrode 230.

In other words, the first wire electrode 310 may be formed together with the first and second sensing electrodes 210 and 220 through the same process. In addition, the second wire electrode 320 may be formed together with the bridge electrode 230 through the same process. Accordingly, the first and second wire electrodes 310 and 320 may include a transparent conductive material such as ITO.

Figure 4:
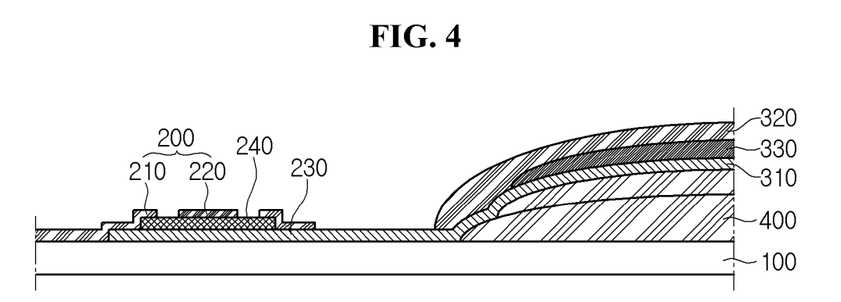
Figure 8:
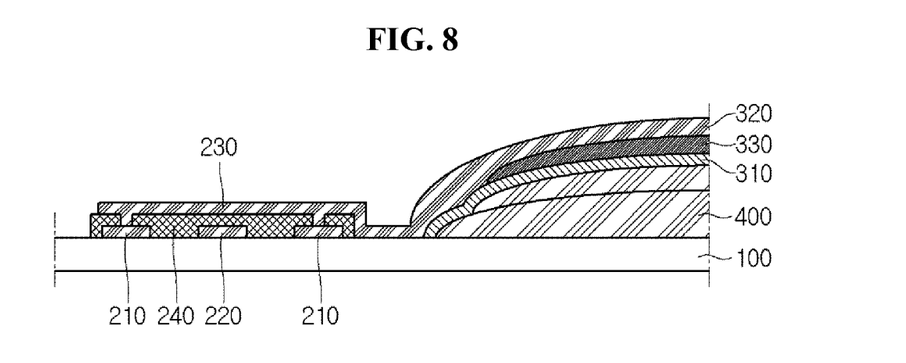

Referring to FIGS. 4 and 8, a second insulating layer 330 may be further provided on the inactive area UA. In detail, the second insulating layer 330 may be interposed between the first and second wire electrodes 310 and 320.

The second insulating layer 330 may separate the first wire electrode 310 from the second wire electrode 320. In detail, the first and second wire electrodes 310 and 320 may be partially separated from each other or partially combined to each other.

The second insulating layer 330 may be arranged to surround the first wire electrode 310. In other words, the second insulating layer 330 may be arranged to a lateral side and a top surface of the first wire electrode 310, and the second wire electrode 320 may be arranged on the top surface of the second insulating layer 330.

The second insulating layer 330 may include the same insulating material as that constituting the first insulating layer 240. In other words, the first and second insulating layers 240 and 330 may be simultaneously formed through the same process.

Figure 5:
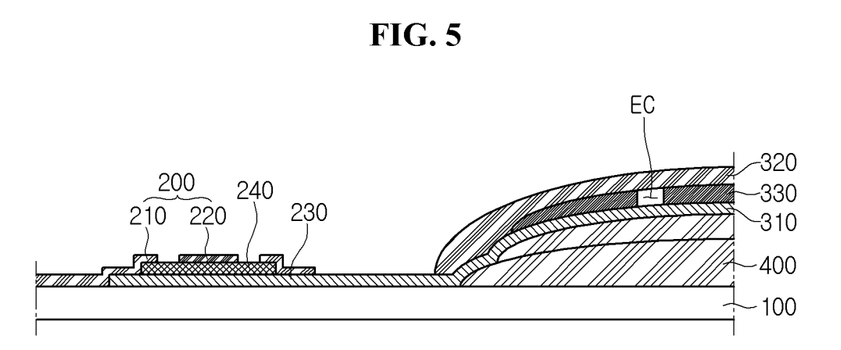
Figure 6:
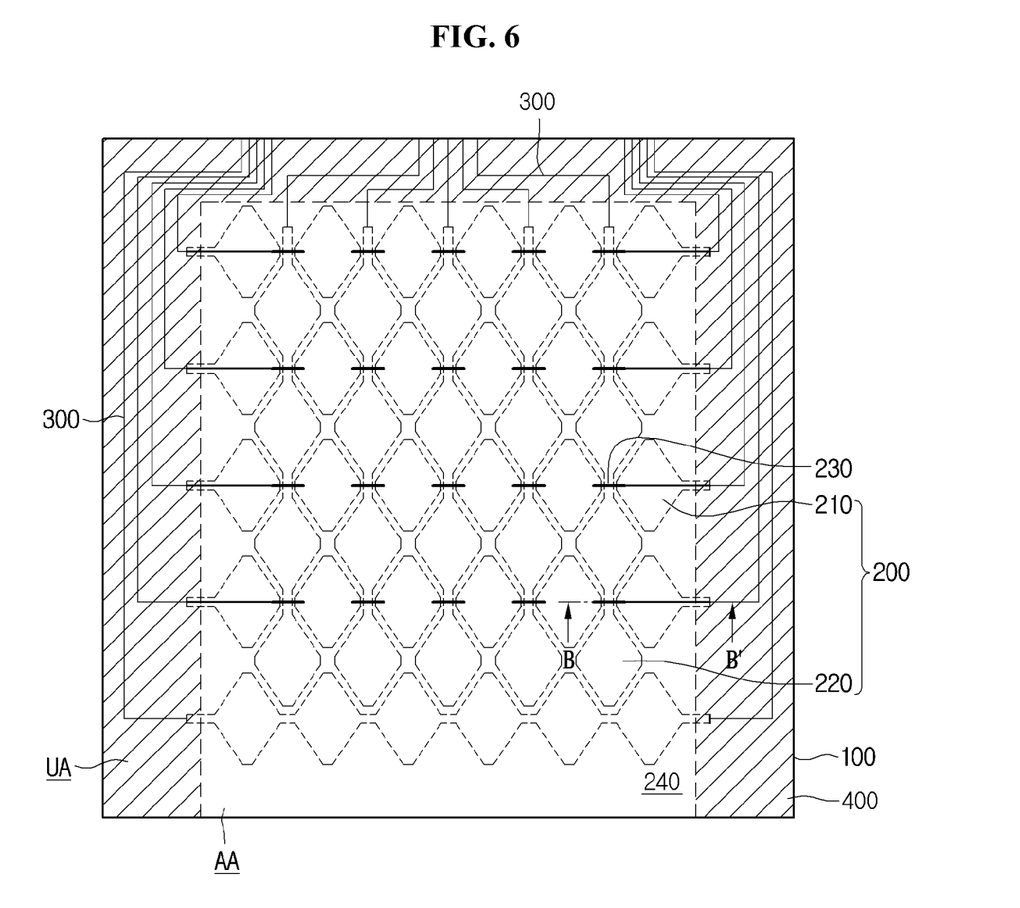
FIG. 6 is a plan view showing a touch panel according to the second embodiment.
Figure 9:
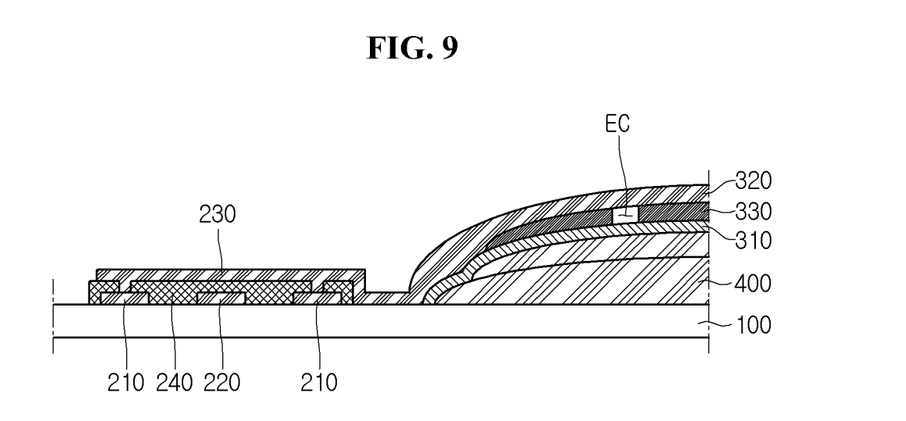

Referring to FIGS. 5 and 9, a conduction area EC may be formed in the second insulating layer 330. In detail, the second insulating layer 330 may include the conduction area EC to electrically connect the first and second wire electrodes 310 and 320, which are at upper and lower portions of the second insulating layer 330, respectively, with each other.

When one of the first and second wire electrodes 310 and 320 is cracked and damaged, the other of the first and second wire electrodes 310 and 320 may serve as a wire through the conductive are EC.

The wire electrode 300 may have the thickness of about 200 Å to about 400 Å. If the wire electrode 300 has the thickness of about 200 Å or less, the resistance of the wire electrode 300 may be increased, so that the efficiency of the wire electrode 300 may be degraded. If the wire electrode 300 has the thickness exceeding 400 Å, the thickness of the inactive area UA may be increased, so that the whole thickness may be increased.

If the wire electrode 300 may have the thickness of about 200 Å to about 400 Å, the wire electrode 300 may have the resistance of about 50Ω to about 60Ω. In other words, the wire electrode 300 may have the resistance approximate to that of the metal wire. In this case, the first and second wire electrodes 310 and 320 may have the thickness of about 100 Å to about 200 Å, respectively. The first and second wire electrodes 320 may have equal to each other or different from each other in thickness.

In other words, if the first and second wire electrodes 310 and 320 have the thickness of about 100 Å or less, the whole resistance of the wire electrodes is increased, so that the efficiency may be degraded. If the thickness exceeds about 200 Å, the thickness of the inactive area is increased, so that the whole thickness of the touch panel may be increased.

At least one of the first and second wire electrodes 310 and 320 may be electrically connected with the sensing electrode 200. In other words, at least one of the first and second wire electrodes may include an extension part of at least one of the first and second sensing electrodes. In detail, the sensing electrode 200 may be electrically connected with the second wire electrode 320. In this case, if the second wire electrode 320 is damaged by an external environment so that the second wire electrode 320 does not serve as a wire, the sensing electrode 200 is connected with the first wire electrode 310 so that the first wire electrode 310 may serve as a wire.

A flexible printed circuit board (FPCB) 900 may be further provided on the inactive area UA. The FPCB 900 may be electrically connected with the wire electrode 300. Accordingly, the touch signal generated from the sensing electrode may be transmitted to the driving chip mounted on the FPCB 900 through the wire electrode.

The wire electrode 300 may be bonded to the printed circuit board 900 by applying an anisotropic conductive film (ACF) to a bonding part between the wire electrode 300 and the printed circuit board 900.

As described above, the touch panel according to the embodiment includes the first and second wire electrodes provided on the inactive area. In other words, the first and second wire electrodes may be stacked on each other on the inactive area.

In addition, the first and second wire electrodes may include the same material as that constituting the sensing electrode. In other words, the first and second wire electrodes may be simultaneously provided in the process of providing the first sensing electrode or the second sensing electrode.

Conventionally, the sensing electrode and the wire electrode are formed with mutually different materials through mutually different processes. In detail, the sensing electrode is formed by using a transparent conductive material such as ITO, and the wire electrode is formed by using a metallic material such as silver (Ag) or copper (Cu). Therefore, since the processes are individually performed, the time to form the electrodes is increased.

Therefore, according to the touch panel of the embodiment, the sensing and wire electrodes are simultaneously formed with the same material, so that a process of separately forming the wire electrode can be omitted. Accordingly, the number of processes can be reduced, and the process efficiency can be improved.

In addition, according to the touch panel of the embodiment, at least one of the first and second wire electrodes is connected with the sensing electrode.

Conventionally, in a wire electrode provided on a printing layer, the function of the wire electrode is degraded due to a step difference part of the printing layer as the step difference part is cracked.

Therefore, according to the touch panel of the embodiment, if one of the first and second wire electrodes is cracked so that the cracked wire electrode does not perform a wire function, since the other wire electrode may serve as a wire, the reliability of the touch panel can be improved.

Further, according to the touch panel of the embodiment, the first and second wire electrodes are formed in a parallel structure, that is, at a predetermined thickness on the inactive area, so that only resistance approximate to that of a conventional wire electrode including a metallic material is generated even if the wire electrode includes a transparent conductive material such as ITO. Accordingly, the efficiency of the touch panel can be improved.

Figure 11:
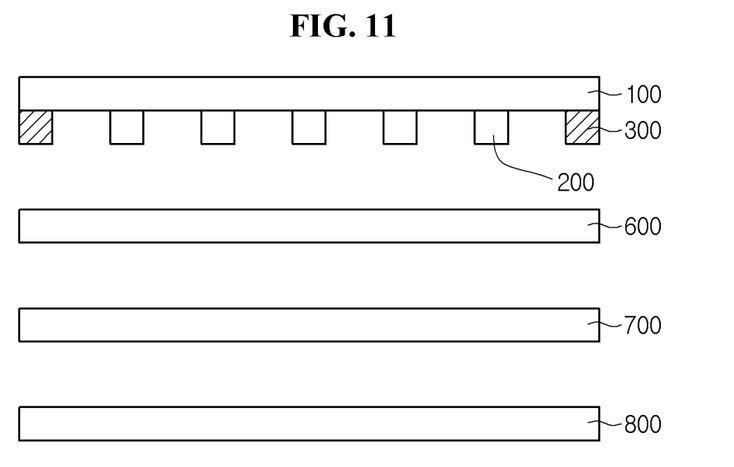
FIGS. 11 to 15 are views one example of a display to which the touch panel is applied according to the embodiments.
Figure 12:
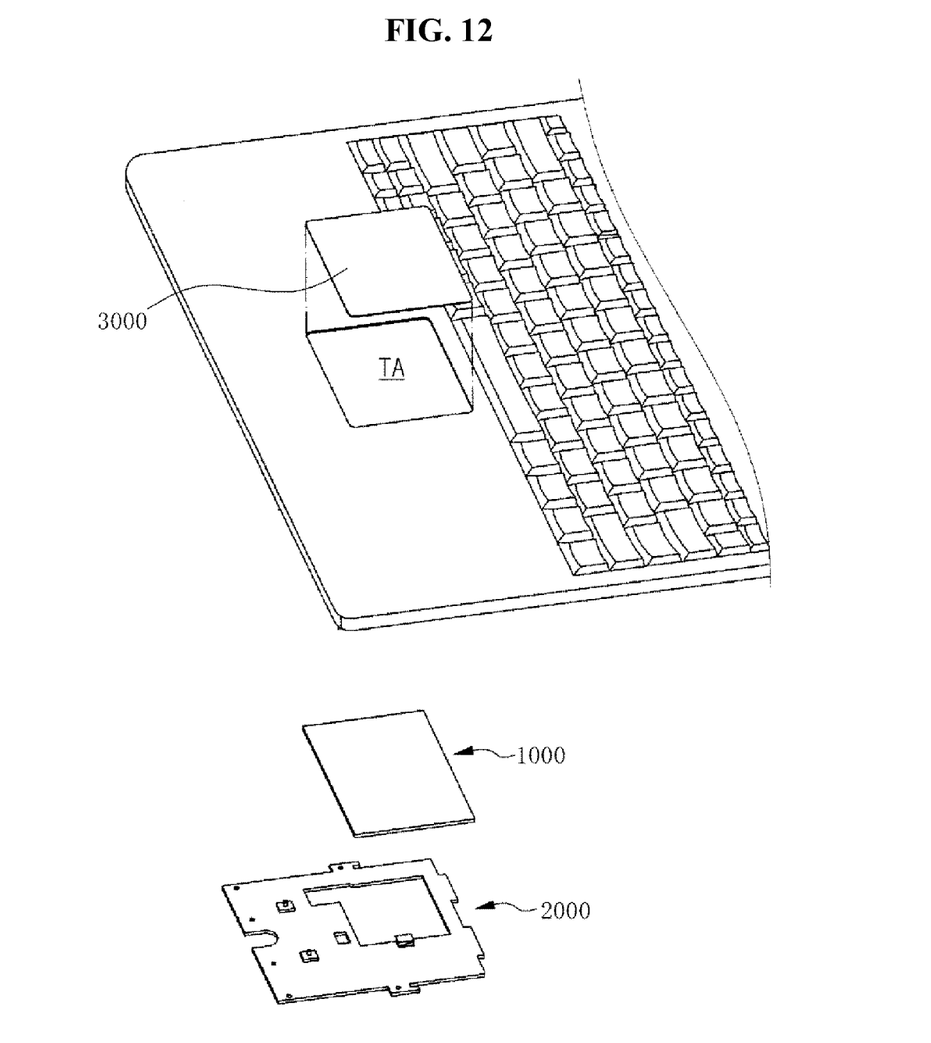

FIGS. 11 and 12 are views showing one example of a display including the above-described touch panel.

Referring to FIG. 11, one example of the display is shown.

The display according to the embodiment includes a cover substrate 100, a sensing electrode 200 and a wire electrode 300 provided on the cover substrate 100, a driving part 700 provided on the cover substrate 100, and a light source part 800 provided on the driving part 700.

The cover substrate 100, the sensing electrode 200, and the wire electrode 300 may have the same structures as those of the corresponding components of the above-described touch panel.

The driving part 700 may include a display panel. The driving part 700 may be bonded to the cover substrate 100 through a bonding layer 600. The display panel is provided therein with a display area to output images. The display panel applied to the display may include upper and lower substrates. The lower substrate may be formed therein with data lines, gate lines, and thin film transistors TFTs. The upper substrate is bonded to the lower substrate to protect components arranged on the lower substrate.

Various types of display panels may be formed depending on the type of the display according to the disclosure. In other words, the display according to the disclosure may include a liquid crystal display (LCD), a field emission display, a plasma display (PDP), an organic light emitting diode (OLED), and an electrophoretic display (EPD). Accordingly, the display panel may be configured in various types.

In addition, referring to FIG. 12, as one example of the display, a portable laptop computer is shown. The portable laptop computer includes a touch panel 1000, a touch sheet 3000, and a circuit board 2000. The touch sheet 3000 is provided on the top surface of the touch panel 1000. The touch sheet 3000 may protect a touch area TA. In addition, the touch sheet 3000 may improve the touch feeling of a user.

Therefore, the touch panel 1000 is provided on a bottom surface thereof with the circuit board 2000 electrically connected with the touch panel 1000. The circuit board 2000, which includes a printed circuit board, may be mounted thereon with various parts to constitute the portable laptop computer.

In a mobile terminal and the above portable laptop computer, as the bonding area between the wire electrode and the printed circuit board is increased, the shapes and the positions of a pad part and the bonding part may be controlled as described according to the embodiments. Therefore, when the wire electrode is bonded to the printed circuit board, the bonding failure can be reduced, so that the reliability of the display can be improved.

Figure 13:
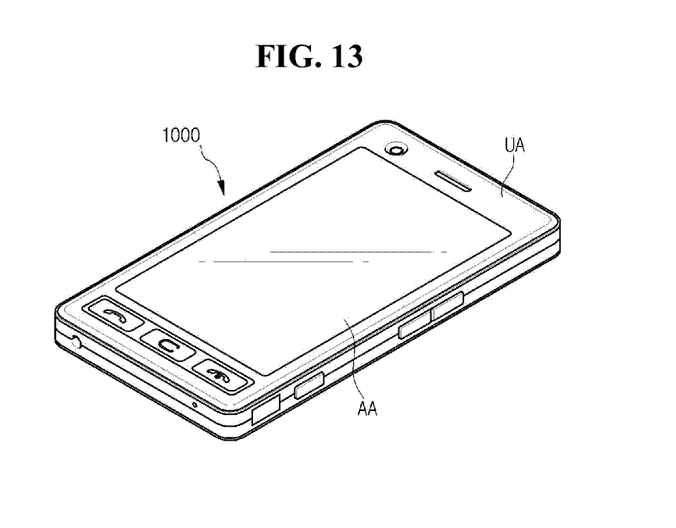

Referring to FIG. 13, the mobile terminal 1000 may include an active area AA and a non-active area UA. The active area AA may detect a touch signal made by a touch of, for example, a finger. In the non-active area UA, a command icon pattern unit and a logo may be provided.

Figure 14:
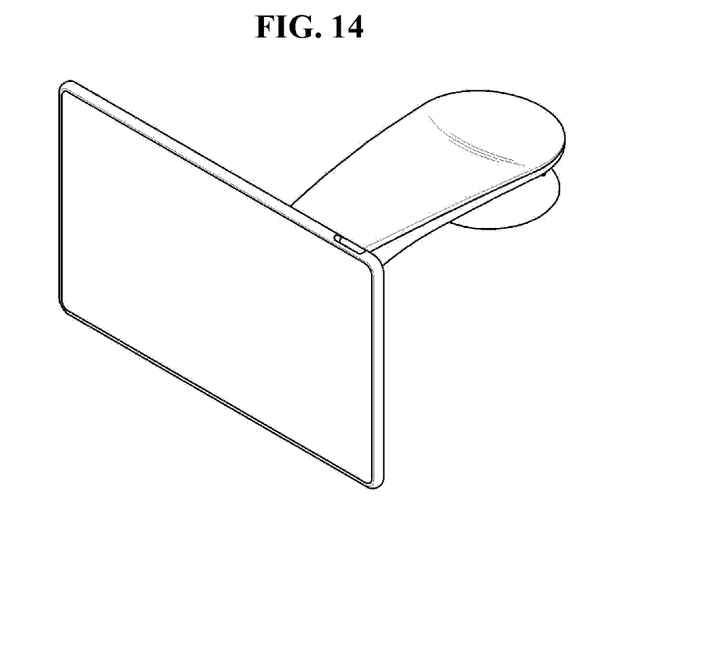
Figure 15:
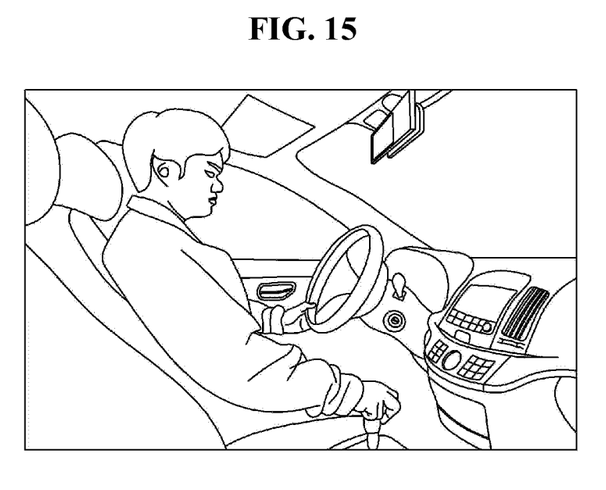

The touch panel according to an exemplary embodiment may be applied to an automobile navigation device 3000, as illustrated in FIG. 14. The touch panel according to an exemplary embodiment may also be applied to the inside of a vehicle, as illustrated in FIG. 15. That is, the touch panel according to an exemplary embodiment may be applied to various parts of a vehicle not only as a personal navigation display (PND), but also as a center information display (CID) for a dashboard, but the invention is not limited thereto. The touch panel according to an exemplary embodiment can be employed in various electronic products, other than those set forth herein.

Although FIGS. 11 to 15 show one example of the display, the embodiment is not limited thereto, but the above described touch panel can be used in vehicles or various electronic products such as home appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a cover substrate comprising an active area and an inactive area;
a sensing electrode on the active area; and
a wire electrode on the inactive area,
wherein the wire electrode comprises a material the same as a material constituting the sensing electrode,
wherein the wire electrode comprises:
a first wire electrode;
a second wire electrode on the first wire electrode; and
a second insulating layer between the first and second wire electrodes, and
wherein the first and second wire electrodes comprise materials the same as the material constituting the sensing electrode.

2. The touch panel of claim 1, wherein the second insulating layer surrounds the first wire electrode.

3. The touch panel of claim 1, wherein the second insulating layer comprises a conductive area to connect the first wire electrode to the second wire electrode.

4. The touch panel of claim 1, wherein the sensing electrode, the first wire electrode, and the second wire electrode comprise a transparent conductive material.

5. The touch panel of claim 4, wherein the transparent conductive material comprises indium tin oxide (ITO).

6. The touch panel of claim 1, further comprising:
a bridge electrode on the active area; and
a first insulating layer on the bridge electrode,
wherein the sensing electrode comprises:
a first sensing electrode on the first insulating layer; and
second sensing electrodes connected with each other through the bridge electrode.

7. The touch panel of claim 6, wherein at least one of first and second wire electrodes serves as an extension part of at least one of the first and second sensing electrodes.

8. The touch panel of claim 6, wherein first and second wire electrodes have thicknesses in a range of about 100 Å to about 200 Å.

9. The touch panel of claim 1, further comprising a first insulating layer formed on the sensing electrode and having a through hole therein; and
a bridge electrode on the first insulating layer,
wherein the sensing electrode comprises:
a first sensing electrode on a substrate; and
second sensing electrodes connected with each other through the bridge electrode.

10. The touch panel of claim 1, wherein the sensing electrode comprises first and second sensing electrodes, and both of the first and second sensing electrodes are provided on one surface of the cover substrate.

11. A touch panel comprising:
a cover substrate;
a substrate provided on the cover substrate and comprising active and inactive areas;
a sensing electrode on the active area; and
a wire electrode on the inactive area,
wherein the wire electrode comprises a material the same as a material constituting the sensing electrode, and
wherein the wire electrode comprises:
a first wire electrode;
a second wire electrode on the first electrode; and
a second insulating layer between the first and second wire electrodes.

12. The touch panel of claim 11, wherein the first wire electrode comprises a material the same as a material constituting the second wire electrode.

13. The touch panel of claim 11, wherein the first and second wire electrodes have thicknesses in a range of about 100 Å to about 200 Å.

14. The touch panel of claim 11, wherein the sensing electrode comprises first and second sensing electrodes, and both of the first and second sensing electrodes are provided on one surface of the substrate.

* * * * *